United States Patent Office 3,191,337
Patented June 29, 1965

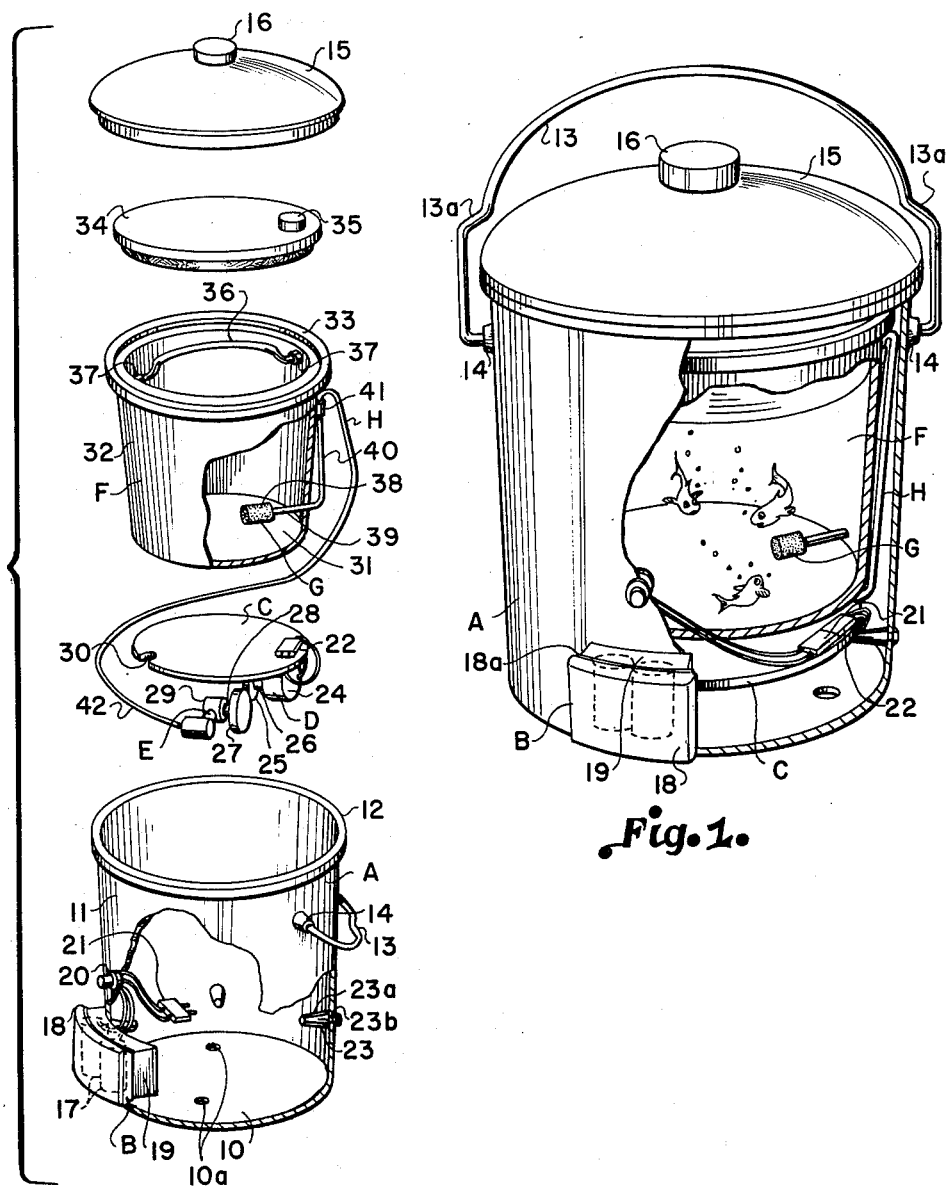

3,191,337
MINNOW BUCKET
John W. Fant, 207 E. Earl St., Anderson, S.C.
Filed Dec. 10, 1962, Ser. No. 243,323
1 Claim. (Cl. 43—57)

This invention relates to fishing equipment and more especially to a container for carrying bait in the form of live minnows especially adapted to aerate the water within the bucket for keeping minnows alive and peppy for extended periods of time.

Minnow buckets commonly in use provide no means for aerating the water within the container so as to provide an air supply for the minnows within such water. Since the water within minnow buckets of present design remains stagnant and only a small portion of the water is exposed to the air, the air contained in the water diminishes relatively rapidly leaving the minnows without an adequate supply of air within the water. Means for aerating water within aquariums are not suitable for use in minnow buckets since such means are not contained within an enclosure and if placed upon a minnow bucket would be easily dislodged. The problem of providing minnow buckets having aerating means has not been solved because no adequate arrangement has been found heretofore for positioning satisfactory aerating means within the bucket while still providing suitable access thereto.

Accordingly, it is an important object of this invention to provide a minnow bucket having effective means for aerating the water therein.

Another object of the invention is to provide a minnow bucket with aerating means which is easily accessible and yet enclosed to prevent damage thereto.

Another object of the invention is to provide aerating means positioned below the water within the minnow bucket, which discharges air under pressure adjacent the lower portion of the water within the bucket and yet prevents water from flowing backward into the compressor means and out of the container.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view, with parts broken away, illustrating a minnow bucket constructed in accordance with the present invention, and FIGURE 2 is an exploded perspective view, at a reduced scale, illustrating the details of the components of the minnow bucket shown in FIGURE 1.

The drawing illustrates a minnow bucket having a first relatively large container A which is preferably open at the top. A receptacle B for batteries and the like is carried by the large container A, for access externally thereof. A removable horizontal partition C is carried in the lower portion of the large container for easy removal therefrom. A motor D operated by the batteries and the like, and a compressor E operated by the motor are positioned within the first relatively large container below the partition and are carried upon the lower surface of the partition. A second smaller container F is carried within the first container above the partition. Means G dispersing air within water contained within the second container is carried in the lower portion thereof. An air line H extends from the compressor above the water level in the second container and downwardly to the means G disbursing air.

The relatively large container A has a base 10 with overflow apertures 10a therein and substantially cylindrical sides 11. The open top portion is defined by a rim 12. A handle 13 is pivotally carried by opposed portions of the sides 11 as at 14. The handle 13 preferably has a camming portion 13a adjacent each side thereof for urging a top 15 of the container into engagement with the rim 12. A handle 16 is provided for lifting the lid 15 from the rim 12. The container A may be constructed of any suitable material, metal or plastic.

The receptacle B is carried by the outside lower portion of the container A for receiving means for supplying power to the aerating means in the form of electric batteries 17. The receptacle B includes a cover 18 which is received upon a housing 19 carried by the side 11 of the container A. The cover has edges 18a which are received by a pressed fit upon the housing 19. The batteries 17 are suitably connected through a plunger operated switch 20, externally of the container A, to supply power through a plug 21 and receptacle 22 to operate the motor means for operating the aerating mechanism.

It will be noted that the receptacle 22 is carried by the upper surface of the partition C. The horizontal removable partition C is carried upon spaced resilient supports 23 spaced about the inner periphery of the container A in the lower portion thereof. The supports 23 include a resilient buffer 23a and threaded means 23b for fixing the buffer 23a to the container walls 11.

The motor means D is provided in the form of an electric motor 24 fixed to and depending from the lower surface of the partition C. The motor 24 drives a wheel 25 through the shaft 26. The compressor mechanism E includes a drive wheel 27 which is frictionally engaged by the drive wheel 25 to turn the shaft 28 to operate a piston (not shown) within the compressor 29. Such compressor means E discharges air through means passing through the opening 30 in the partition C into the container F.

The container F includes a base portion 31 and substantially cylindrical sides 32. The container F also has a rim 33 and is provided with a top 34 having a handle 35. The container F has a handle 36 pivoted internally of the container at each end thereof. Means dispersing air G includes what is known as an air rock 38. The air line H has an inwardly projecting portion 39 within the bucket which may, if desired, discharge directly into the water. The air line H has a portion 40 extending upwardly where it is fastened by the bracket 41 above the water contained within the container F. A portion 42 extends downwardly through the cut-out portion 30 in the partition C and is attached to the compressor means E. As disclosed in FIGURE 2, air line H is of sufficient length to permit the removal of container F from the container A without making an air line disconnection.

Thus a minnow bucket with aerating means which may be easily assembled and disassembled has been provided. The motor driving means are easily accessible for replacement. All the operating parts are concealed and protected against damage. The compressor and the aerating means are positioned adjacent the bottom of the bucket and yet are accessible and water is prevented from flowing from the bucket into the lower compartment housing the compressor.

While a preferred embodiment of the invention has been described using specific terms, such description is for illustrative purposes only, and it is to be understood that changes and variations may be made without departing from the spirit or scope of the following claim.

What is claimed is:

A portable minnow bucket including, a first container open at the top thereof, a receptacle for batteries carried by said first container for access externally thereof, a horizontal partition, means removably supporting said partition in the lower portion of said first container, a motor operated by said batteries, a compressor operated by said motor, said motor and compressor carried within said first container and mounted on the lower surface of said partition, a second smaller, water-receiving container carried within said first container above said partition, an air dispensing means contained within the lower portion of said second container, and an elongated air line of sufficient length to permit the withdrawal of said second container from said first container and said line extending upwardly from said compressor to a point approaching the top of said second container and downwardly to said dispensing means.

References Cited by the Examiner
UNITED STATES PATENTS

| | | | |
|---|---|---|---|
| 750,143 | 1/04 | Wilson et al. | 43—57 |
| 1,852,267 | 4/32 | Roush. | |
| 2,020,536 | 11/35 | Cox | 43—56 |
| 2,550,533 | 4/51 | Clark | 43—57 |
| 2,960,321 | 11/60 | Stoots | 43—57 |

ABRAHAM G. STONE, *Primary Examiner.*